United States Patent
Davis et al.

(10) Patent No.: US 9,681,265 B1
(45) Date of Patent: Jun. 13, 2017

(54) SYSTEM TO TRACK ENGAGEMENT OF MEDIA ITEMS

(71) Applicant: SNAP INC., Venice, CA (US)

(72) Inventors: Brent Davis, Venice, CA (US); Peter Sellis, Venice, CA (US); Farnaz Azmoodeh, Venice, CA (US); Samir Ahmed, Marina del Rey, CA (US); Douglas Cohen, Venice, CA (US)

(73) Assignee: SNAP INC., Venice, CA (US)

( * ) Notice: Subject to any disclaimer, the term of this patent is extended or adjusted under 35 U.S.C. 154(b) by 0 days.

(21) Appl. No.: 15/195,684

(22) Filed: Jun. 28, 2016

(51) Int. Cl.
*H04W 24/00* (2009.01)
*H04W 4/02* (2009.01)
*H04L 12/58* (2006.01)
*G06F 17/30* (2006.01)
*G06Q 30/02* (2012.01)

(52) U.S. Cl.
CPC ........ *H04W 4/021* (2013.01); *G06F 17/3053* (2013.01); *G06F 17/3087* (2013.01); *G06F 17/30241* (2013.01); *G06F 17/30551* (2013.01); *G06F 17/30554* (2013.01); *G06Q 30/0261* (2013.01); *H04L 51/32* (2013.01); *H04W 4/023* (2013.01)

(58) Field of Classification Search
None
See application file for complete search history.

(56) References Cited

U.S. PATENT DOCUMENTS

| | | | |
|---|---|---|---|
| 2012/0122434 A1* | 5/2012 | Rao | H04L 67/06 455/414.1 |
| 2016/0057571 A1* | 2/2016 | Florins | H04W 4/021 455/456.3 |
| 2016/0330155 A1* | 11/2016 | Moreau | H04L 51/10 |
| 2016/0342593 A1* | 11/2016 | Raichelgauz | G06F 17/30029 |
| 2017/0018008 A1* | 1/2017 | Hajiyev | G06Q 30/0251 |

* cited by examiner

*Primary Examiner* — Suhail Khan
(74) *Attorney, Agent, or Firm* — Schwegman Lundberg & Woessner, P.A.

(57) ABSTRACT

An engagement tracking system monitors user interactions with media items to calculate an engagement score of the media item. The engagement tracking system may be or include a group of one or more server machines configured to detect an exposure of a client device to a media item maintained by the engagement tracking system. In response to detecting the exposure of the client device to the media item, the engagement tracking system tracks a location of the client device based on access requests to location based media items. The engagement tracking system may thereby monitor client devices exposed to the media item in order to calculate an engagement score of the media item.

18 Claims, 12 Drawing Sheets

800

MAINTAIN A GEO-FENCE THAT ENCOMPASSES A PHYSICAL LOCATION OF A PROPRIETOR AND CONFIGURED TO PROVIDE ACCESS TO A MEDIA ITEM TO USER DEVICES WITHIN A BOUNDARY OF THE GEO-FENCE
802

DETECTING AN EXPOSURE OF THE MEDIA ITEM TO A FIRST USER DEVICE
804

TRACKING THE FIRST USER DEVICE IN RESPONSE TO DETECTING THE EXPOSURE
806

DETECTING AN ACCESS OF THE MEDIA ITEM BY THE FIRST USER DEVICE
808

CALCULATING AN ENGAGEMENT SCORE OF THE MEDIA ITEM IN RESPONSE TO DETECTING THE ACCESS
810

FIG. 8

900
CALCULATING A BASELINE VISITATION OF A PHYSICAL LOCATION BASED
ON HISTORICAL TRANSGRESSIONS OF A GEO-FENCE
902
CALCULATING A NEW VISITATION OF THE PHYSICAL LOCATION BASED ON
ACCESS REQUESTS FOR THE MEDIA ITEM
904
CALCULATING A LIFT OF THE MEDIA ITEM BASED ON THE BASELINE
VISITATION AND THE NEW VISITATION
906
CALCULATING THE ENGAGEMENT SCORE BASED ON THE LIFT
908
FIG. 9

SYSTEM TO TRACK ENGAGEMENT OF MEDIA ITEMS

TECHNICAL FIELD

Embodiments of the present disclosure relate generally to mobile computing technology and, more particularly, but not by way of limitation, to geolocation-based media items.

BACKGROUND

A geo-fence is a virtual boundary that encompasses a real-world geographic area. Once the virtual boundary is established, an administrator can set triggers to transmit content when devices enter (or exit) the specified region. Advertisers often utilize geo-fences for the purpose of distributing marketing campaigns to devices that transgress the virtual boundary of the geo-fence.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 8 is a flowchart illustrating a method for calculating an engagement score, according to certain example embodiments.

FIG. 9 is a flowchart illustrating a method for calculating an engagement score, according to certain example embodiments.

GLOSSARY

Figure 1:
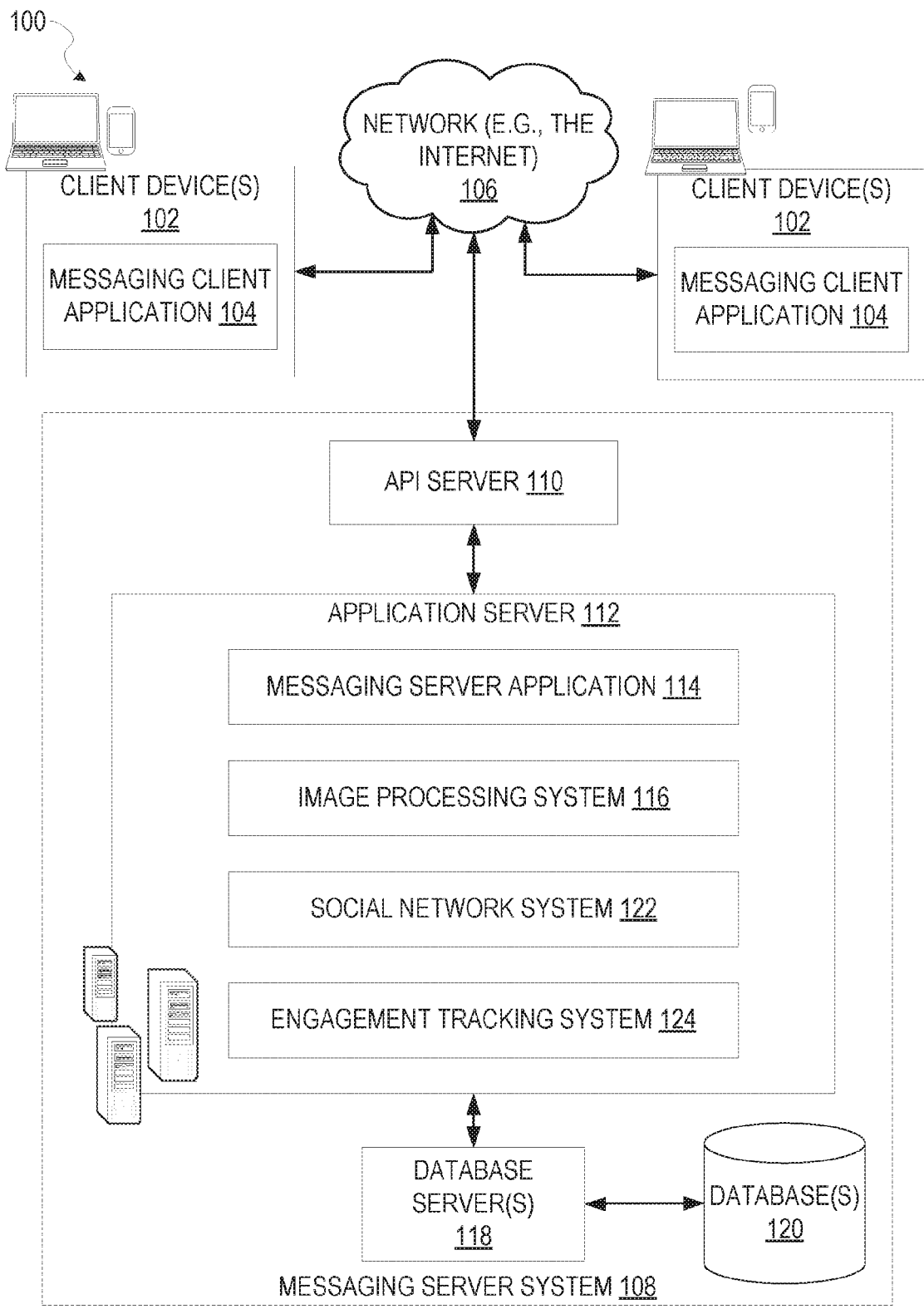
FIG. 1 is a block diagram showing an example messaging system for exchanging data (e.g., messages and associated content) over a network in accordance with some embodiments, wherein the messaging system includes an engagement tracking system.

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA). Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

DETAILED DESCRIPTION

An engagement tracking system monitors user interactions with media items to calculate an engagement score of the media item. The engagement tracking system may be or include any instrumentality or aggregate of instrumentalities operable to compute, process, store, display, generate, communicate, or apply various forms of data for geo-fencing, control, or other purposes. For example, the engagement tracking system may be or include a group of one or more server machines configured to detect an exposure of a client device to a media item associated with a geo-fenced area maintained by the engagement tracking system. In response to detecting the exposure of the client device to the media item, the engagement tracking system tracks a location of the client device based on access requests to location based media items. The engagement tracking system may thereby monitor client devices exposed to the media item in order to calculate an engagement score of the media item.

In various embodiments, an engagement score of a media item can be calculated based on principles described herein. The term "media item" may refer to pictures, videos, and multimedia items to be displayed at client devices. For example, a media item may include an overlay or filter that a user of the client device may append to a digital message. Media items may be location as well as experience based, such that the media item is subject to access conditions that include geo-location or other experience based trigger criteria (e.g., scanning or entering a code, or the occurrence of an event). In such embodiments, the media item may be associated with a set (or sets) of coordinates identifying one or more physical location encompassed by one or more geo-fences. For example, a proprietor may distribute the media item to client devices located within a boundary of the associated geo-fences, and recipients of the media item may thereby distribute the media item to a network of client devices.

Geo-fencing is the practice of using location-aware devices (for example, but not limited to global positioning (GPS) or radio frequency identification (RFID)) to define a geographic boundary around a physical location. Once the "virtual barrier" of the geo-fence is established, an administrator of the geo-fence (e.g., a proprietor of a physical location) can set up triggers that distribute media items, text messages, email alerts, as well as notifications when client devices transgress the boundary of the geo-fence. In some example embodiments, a proprietor may generate a location based media item with access conditions that include temporal as well as geolocation criteria, governed by a geo-fence. For example, the geo-fence may be configured to enable access to the media item in response to client devices transgressing the boundary of the geo-fence at predefined times. In this way, the proprietor may distribute incentives to a population of users that satisfy specific access conditions. Additionally, the location of a client device can be inferred based on access requests for location based media item associated with geo-fences.

The engagement score is a measure of an audience's response to the media item based on user interactions with the media item. User interactions include requests to access the media item (e.g., based on a location of the client device), sharing the media item (e.g., via a deliverable message, or through social media), as well as viewing and causing display of the media item on a client device. For example, the engagement tracking system may monitor client devices exposed to a location based media item in order to calculate an engagement score of the media item based on visitations of the client devices to geo-fenced areas.

Consider the following example from a user perspective. A user is exposed to a media item associated with proprietor. For example, the media item may be associated with one or more sets of coordinates that identify physical locations associated with the proprietor, and the engagement tracking system may maintain one or more geo-fences that encompass those physical locations. In response to the exposure to the media item, the engagement tracking system identifies and tracks visitations of a client device of the user, based on the geo-fences. In some example embodiments, the exposure to the media item may cause the engagement tracking system to track the client device for a predefined period of time (e.g., 1 week, 30 days, etc.).

Subsequent to the exposure to the media item, the user transgresses the boundary of a geo-fence associated with the proprietor associated with the media item exposed to the user. The engagement tracking calculates an engagement score of the media item based on a number of user interaction aspects that include, for example, a period of time between the exposure to the media item and an arrival at the associated geo-fence, the means in which the user was initially exposed to the media item, as well as a number of users which transgress the boundary of the geo-fence subsequent to exposure to the media item.

In some example embodiments, the engagement score may additionally be based on a "lift" of the media item. "Lift" is a measure of the performance of a targeted model at predicting or classifying cases as having an enhanced response (with respect to a population as a whole), measured against a random choice targeting model. A targeting model is doing a good job if the response within the target is much better than the average for the population as a whole. Lift is therefore the ratio of target response to average response. Here, the target response would be a visitation rate of exposed client devices to the geo-fenced area, while the average response would be the baseline visitation of the geo-fenced area over a given period of time. The engagement tracking system calculates a visitation rate of client devices exposed to the media item based on the exposed client devices satisfying the access conditions of the media item, and compares the visitation rate against a baseline visitation rate of client devices not exposed to the media item. The engagement score may include the lift.

In some example embodiments, the engagement tracking system may generate a visualization of the engagement score of the media item. The visualization may include a chart or graph that indicates a rate of change of a visitation of a geo-fenced area in response to exposure to a media item. For example, the engagement tracking system may calculate a baseline visitation score associated with a geo-fenced area, based on normal visitations of unexposed client devices. The engagement tracking system may thereby distribute a media item associated with the geo-fenced area, and track client devices exposed to the media item to determine whether the client devices become more likely to visit the geo-fenced area within a predefined time frame.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and an engagement tracking system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The engagement tracking system 124 provides functionality to monitor and calculate an engagement score of media items distributed by the messaging server application 114. The engagement tracking system 124 maintains one or more geo-fences that encompass physical locations, and manages the distribution and access of media items associated with the geo-fences.

The application server 112 is communicatively coupled to a database server 118, which facilitates access to a database 120 in which is stored data associated with messages processed by the messaging server application 114.

Figure 2:
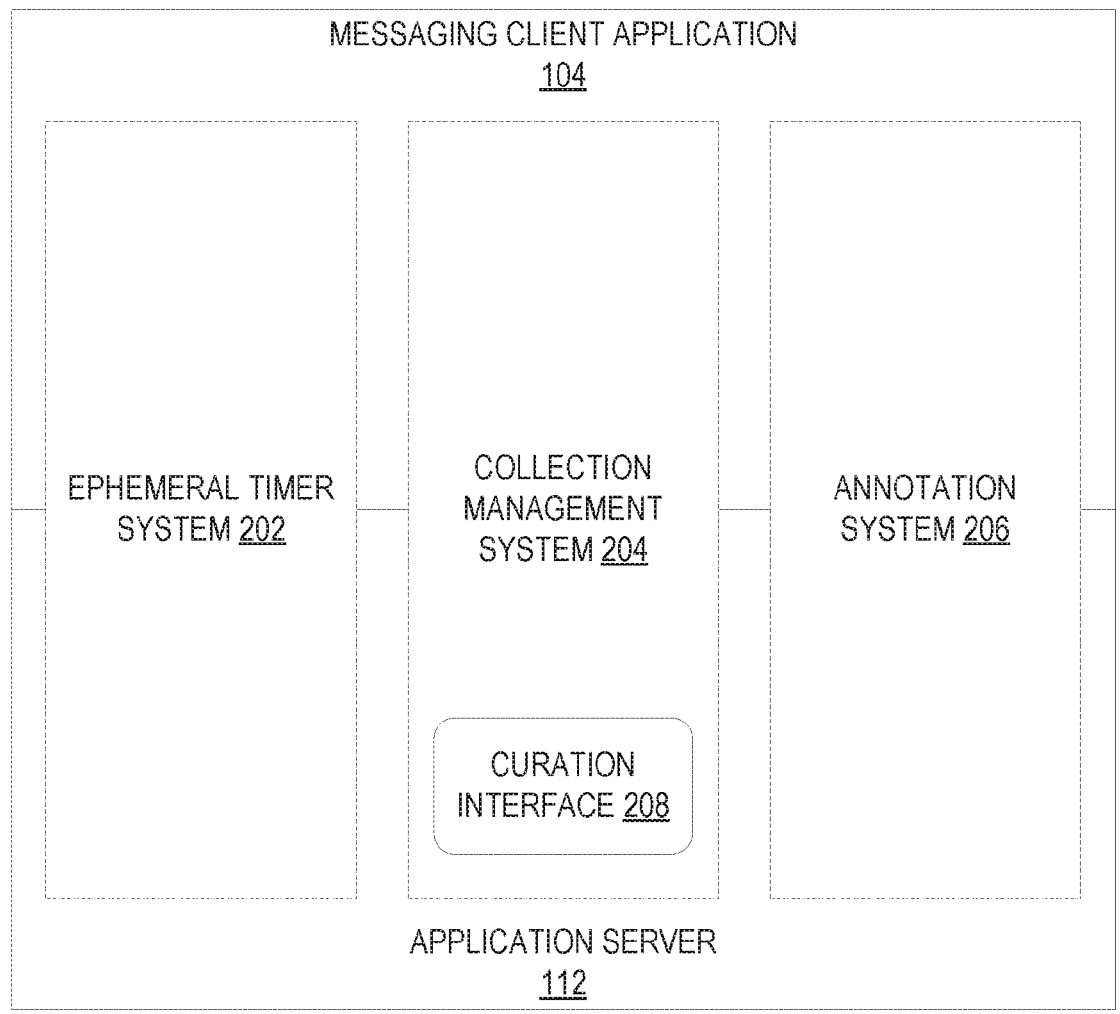
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT story), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
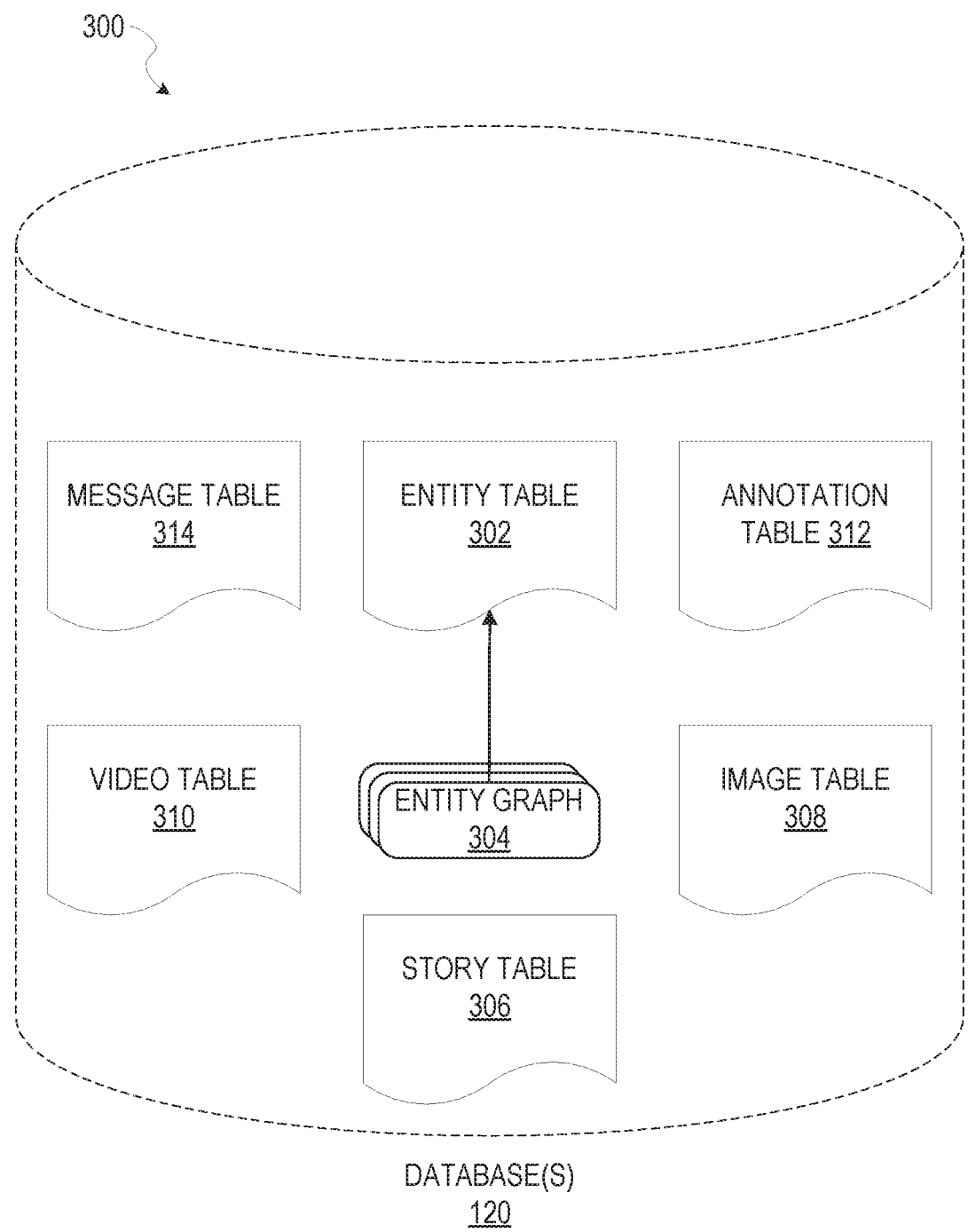
FIG. 3 is a schematic diagram illustrating data which may be stored in the database of the messaging server system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a schematic diagram 300 illustrating data 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including a user-selected filters from a gallery of filters presented to a sending user by the messaging client application 104 when the sending user is composing a message. Other types of filers include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102 or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video or audio data, which are compiled into a collection (e.g., a SNAPCHAT story or a gallery). The creation of a particular collection may be initiated by a particular user (e.g., each user for which a record is maintained in the entity table 302) A user may create a "personal story" in the form of a collection of content that has been created and sent/broadcast by that user. To this end, the user interface of the messaging client application 104 may include an icon that is user selectable to enable a sending user to add specific content to his or her personal story.

A collection may also constitute a "live story." which is a collection of content from multiple users that is created manually, automatically or using a combination of manual and automatic techniques. For example, a "live story" may constitute a curated stream of user-submitted content from varies locations and events. Users, whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
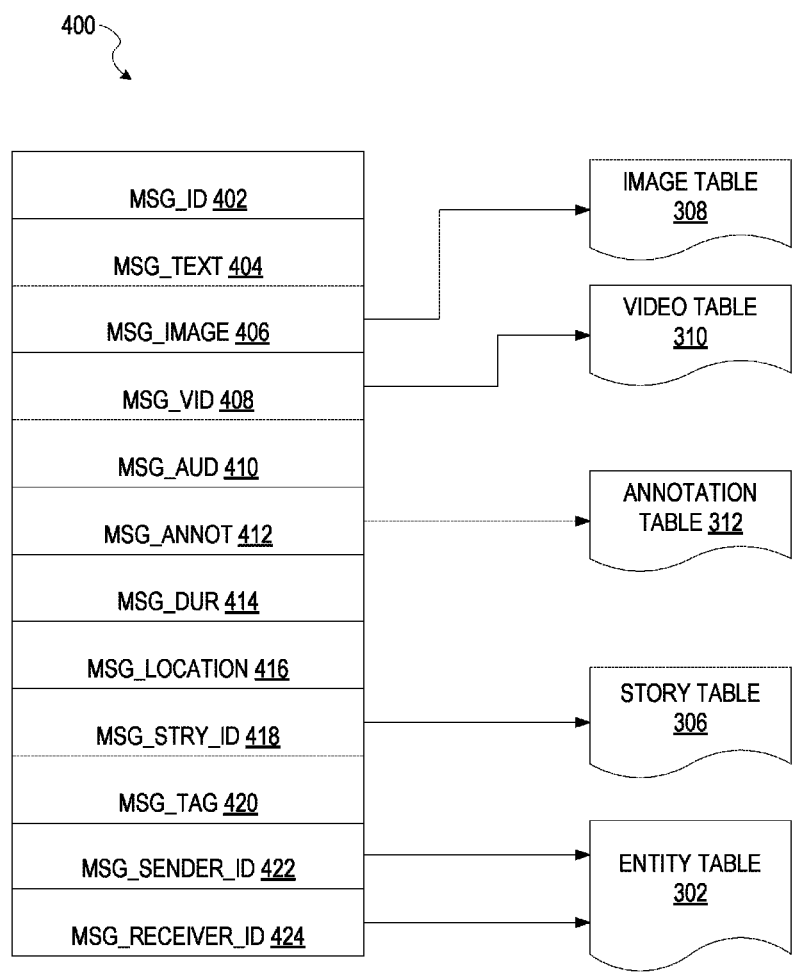
FIG. 4 is a schematic diagram illustrating a structure of a message, according to some embodiments, generated by a messaging client application for communication.

FIG. 4 is a schematic diagram illustrating a structure of a message 400, according to some in some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

- A message identifier 402: a unique identifier that identifies the message 400.
- A message text payload 404: text, to be generated by a user via a user interface of the client device 102 and that is included in the message 400.
- A message image payload 406: image data, captured by a camera component of a client device 102 or retrieved from memory of a client device 102, and that is included in the message 400.
- A message video payload 408: video data, captured by a camera component or retrieved from a memory component of the client device 102 and that is included in the message 400.
- A message audio payload 410: audio data, captured by a microphone or retrieved from the memory component of the client device 102, and that is included in the message 400.
- A message annotations 412: annotation data (e.g., filters, stickers or other enhancements) that represents annotations to be applied to message image payload 406, message video payload 408, or message audio payload 410 of the message 400.
- A message duration parameter 414: parameter value indicating, in seconds, the amount of time for which content of the message (e.g., the message image payload 406, message video payload 408, message audio payload 410) is to be presented or made accessible to a user via the messaging client application 104.
- A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.
- A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- A message sender identifier 422: an identifier (e.g., a messaging system identifier, email address or device identifier) indicative of a user of the client device 102 on which the message 400 was generated and from which the message 400 was sent
- A message receiver identifier 424: an identifier (e.g., a messaging system identifier, email address or device identifier) indicative of a user of the client device 102 to which the message 400 is addressed.

The contents (e.g. values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
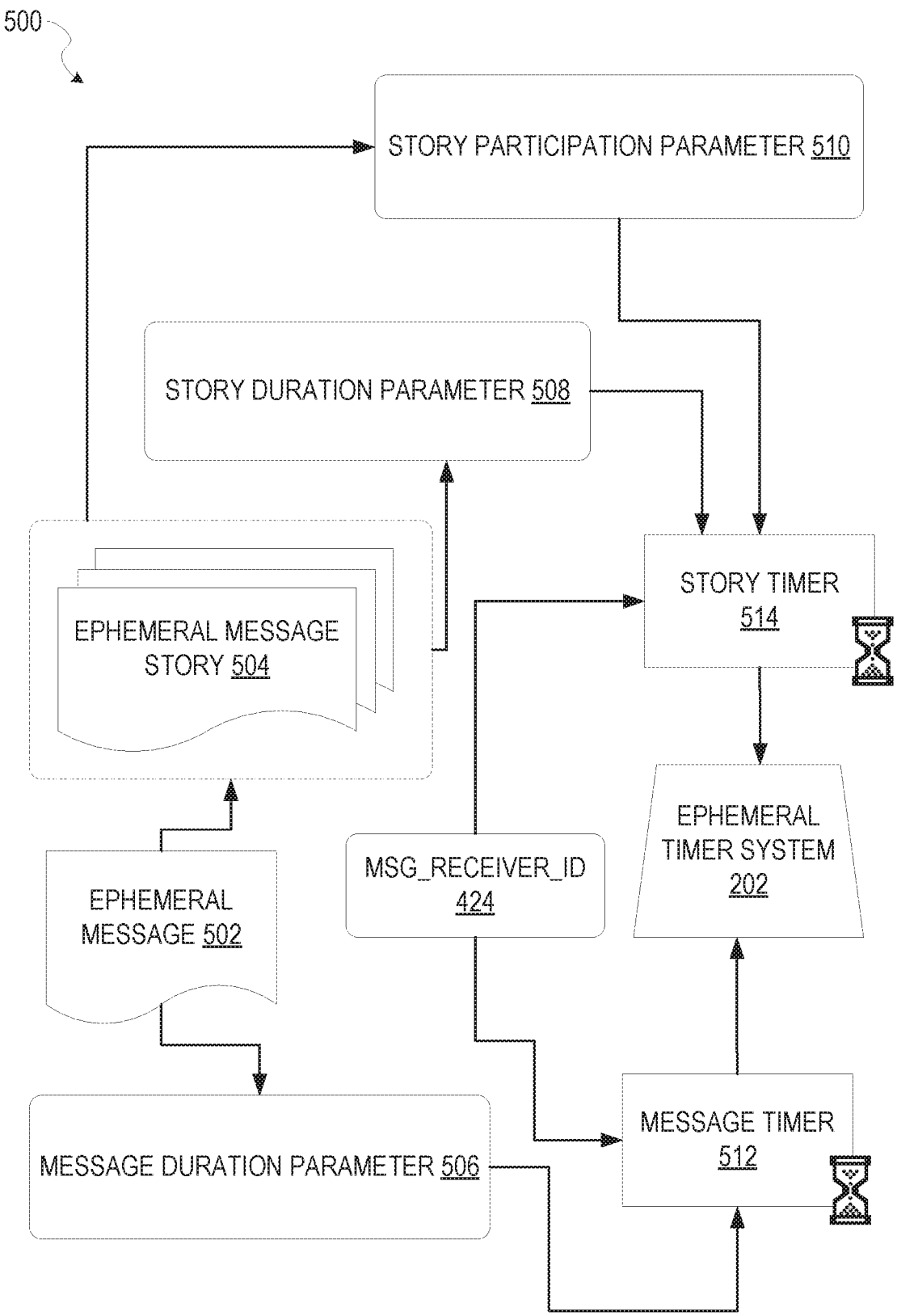
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral) in accordance with some embodiments.

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is a SNAPCHAT application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal SNAPCHAT story, or an event story). The ephemeral message story 504 has an associated story duration parameter 508, a value of which determines a time-duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message story 504 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines, firstly, whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time-period specified by the story duration parameter 508. In a further embodiment, a certain ephemeral message 502 may expire, within the context of ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

Responsive to the ephemeral timer system 202 determining that an ephemeral message story 504 has expired (e.g., is no longer accessible), the ephemeral timer system 202 communicates with the messaging system 100 (and, for example, specifically the messaging client application 104 to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
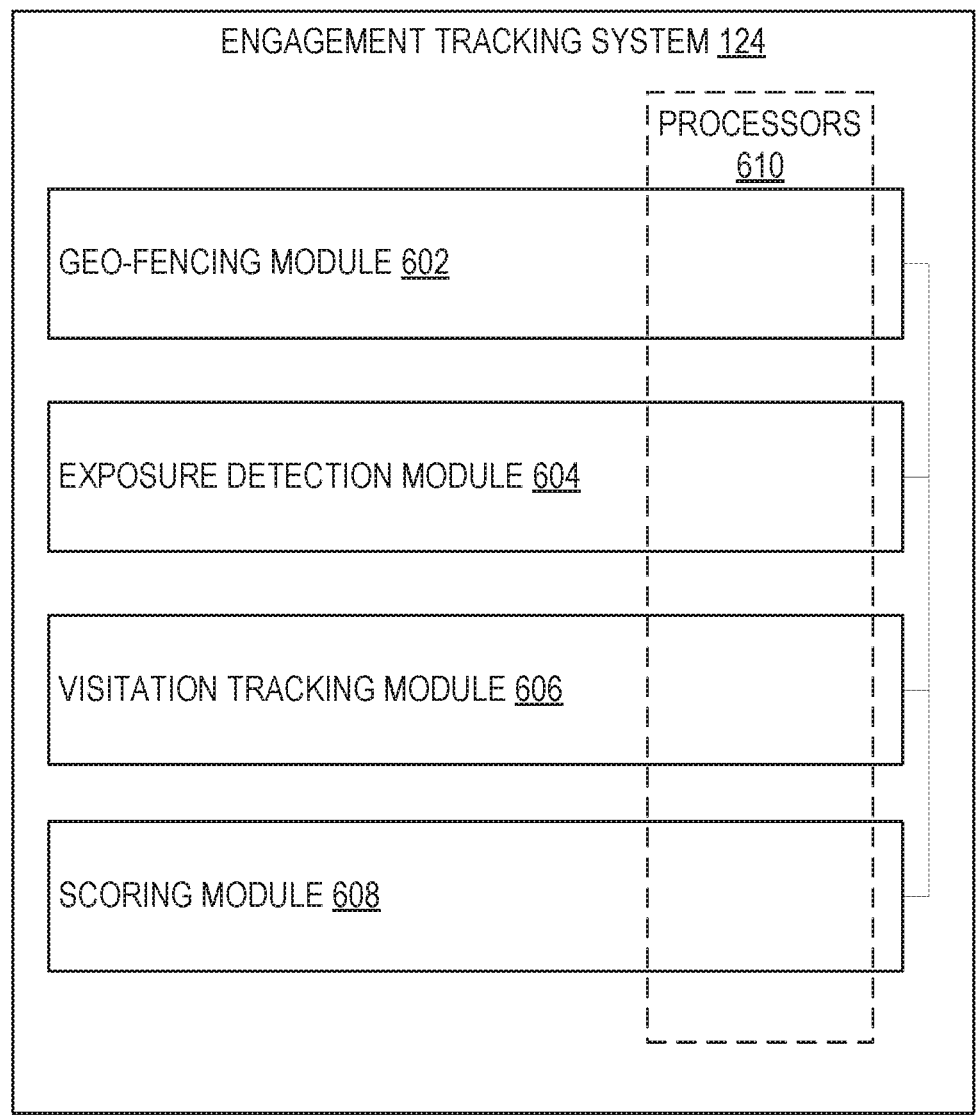
FIG. 6 is a block diagram illustrating various modules of an engagement tracking system according to certain example embodiments.

FIG. 6 is a block diagram illustrating components of the engagement tracking system 124, that configure the engagement tracking system 124 to maintain a set of geo-fences, detect exposure of media items to client devices, and calculate engagement scores of media items, according to some example embodiments. The engagement tracking system 124 is shown as including a geo-fencing module 602, an exposure detecting module 604, a visitation tracking module 606, and a scoring module 608, all configured to communicate with each other (e.g., via a bus, shared memory, or a switch). Any one or more of these modules may be implemented using one or more processors 610 (e.g., by configuring such one or more processors to perform functions described for that module) and hence may include one or more of the processors 610.

Any one or more of the modules described may be implemented using hardware alone (e.g., one or more of the processors 610 of a machine) or a combination of hardware and software. For example, any module described of the engagement tracking system 124 may physically include an arrangement of one or more of the processors 610 (e.g., a subset of or among the one or more processors of the machine) configured to perform the operations described herein for that module. As another example, any module of the engagement tracking system 610 may include software, hardware, or both, that configure an arrangement of one or more processors 610 (e.g., among the one or more processors of the machine) to perform the operations described herein for that module. Accordingly, different modules of the engagement tracking system 610 may include and configure different arrangements of such processors 610 or a single arrangement of such processors 610 at different points in time. Moreover, any two or more modules of the engagement tracking system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 7:
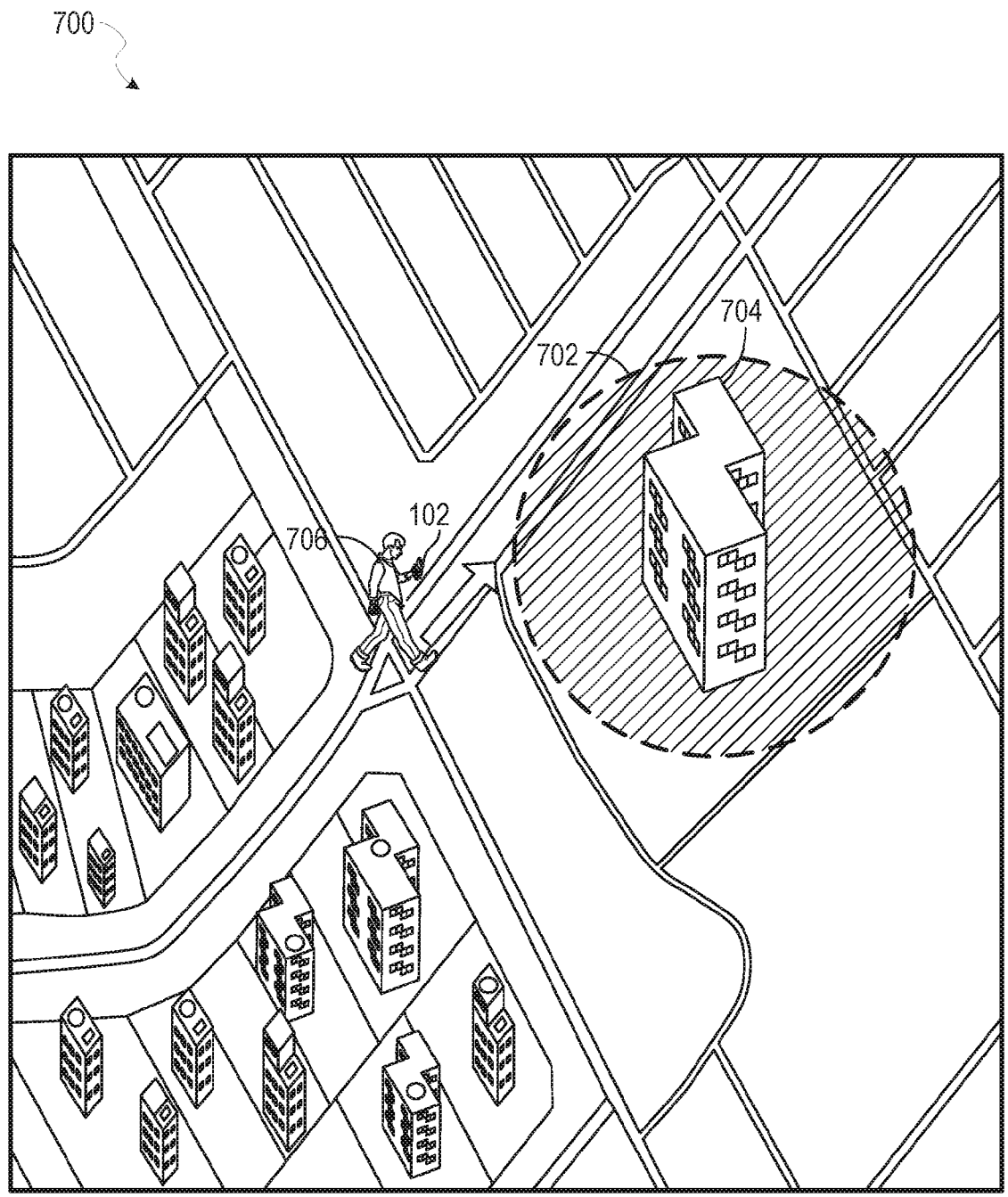
FIG. 7 is a diagram illustrating a geo-fence generated and maintained by an engagement tracking system, according to certain example embodiments.

FIG. 7 is a diagram 700 illustrating a geo-fence 702 generated and maintained by an engagement tracking system 124, according to certain example embodiments. As seen in FIG. 7, the geo-fence 702 encompasses a physical location 704. As a user 706 carries client device 102 through the boundary of geo-fence 702, the engagement tracking system 124 may provide access to a location based media item to the client device 102.

FIG. 8 is a flowchart illustrating operations of the engagement tracking system 124 in performing a method 800 for calculating an engagement score of a media item, according to certain example embodiments. As shown in FIG. 8, one or more operations 802, 804, 806, 808, and 810 may be performed as part (e.g., a precursor task, a subroutine, or a portion) of the method 800, according to some example embodiments.

In operation 802, the geo-fencing module 602 maintains a geo-fence (e.g., geo-fence 702 of FIG. 7) that encompasses a physical location associated with a proprietor (e.g., physical location 704). In certain example embodiments, the geo-fence may be configured to provide access to a media item based on access conditions that include geo-location criteria. As client devices transgress a boundary of the geo-fence, the geo-fencing module 602 provides access to the media item. Client devices with access to the media item may thereby distribute or otherwise share the media item via a social network.

In operation 804, the exposure detection module 604 detects an exposure of a media item associated with the geo-fence at a first client device. For example, a user within the boundary of the geo-fence may have distributed the media item as a component of an ephemeral message through a social network to a set of client devices that included the first client device. Having received the media item, the first client device may cause display of the media item. In response to causing display of the media item, the exposure detecting module 604 detects an exposure of the first client device to the media item. In detecting the exposure of the first client device to the media item, the exposure detection module 604 may note a time and date in which the exposure to the media item occurred (e.g., a first moment).

In operation 806, the visitation tracking module 606 tracks the first client device in response to detecting the exposure to the media item. Specifically, the visitation tracking module 606 may monitor access requests from the first client device to geo-fences to access other location based media items. Based on the access requests, the visitation tracking module 606 may track a location of the first client device. In some example embodiments, the visitation tracking module 606 tracks the first client device for a predefined period of time beginning at the first moment in time (in which the exposure was initially detected). For example, in response to detecting the exposure to the media item, the visitation tracking module 606 may track user actions performed by the user through the first client device for 30 days to log location based media items accessed by the first client device.

In operation 808, the geo-fencing module 602 identifies the first client device within a boundary of the geo-fence, and receives an access request to access the media item associated with the geo-fence. The visitation tracking module 606 detects the access request for the media item associated with the geo-fence. In some embodiments, the visitation tracking module 606 records a date and time in which the access request was received (e.g., a second moment). For example, the media item may be a location based media item that is only available at the physical location, through the geo-fence. Upon transgressing the boundary of the geo-fence, the client device may request to access the media item. In further embodiments, the access of the media item by the first client device may be based on the first client device visiting a web-page associated with the media item.

In operation 810, the scoring module 608 calculates an engagement score of the media item in response to the visitation module 608 detecting the access request. The engagement score may be based on a period of time from the exposure of the first client device to the media item to the access request for the media item from the first client device. In this way, the engagement tracking system 124 may calculate and quantify an effectiveness of a media item in incentivizing exposed client devices to perform a particular action.

FIG. 9 is a flowchart illustrating operations of the engagement tracking system 124 in performing a method 900 for calculating an engagement score based on a lift calculated by the engagement tracking system 124, according to certain example embodiments. As shown in FIG. 9, one or more operations 902, 904, 906, and 908 may be performed as part (e.g., a precursor task, a subroutine, or a portion) of the method 900, according to some example embodiments.

In operation 902, the visitation tracking module 606 calculates a baseline visitation of a geo-fenced area. The baseline visitation is an indication of a number of client devices within the geo-fenced area during a period of time. For example, the baseline visitation may indicate an average number of client devices that enter into a geo-fenced area in a day. In some example embodiments, the baseline visitation may indicate a historical average visitation on a specific time, day, week, month, season, holiday, or event. For example, the baseline visitation may indicate the average number of client devices that enter a geo-fenced area during Halloween, the month of May, or on Mondays.

The baseline visitation may be calculated based on historical geo-fence data collected by the geo-fencing module 602 and visitation tracking module 606, and stored within the database 120. For example, the geo-fencing module 602 may log the visitation rate of client devices as they enter and exit a geo-fence, and store the visitation rate within the database 120.

In operation 904, the visitation tracking module 604 calculates a new visitation of the geo-fenced area based on access requests for an associated media item, from client devices previously exposed to the media item. For example, client devices previously exposed to the media item may be tagged by the exposure detection module 604, based on associated user profile information. The visitation tracking module 606 identifies client devices previously exposed to the media item within the geo-fenced area, and calculates a new visitation of the geo-fenced area based on the number of exposed user devices.

The visitation tracking module 606 stores a visitation record of user devices exposed to the media item within the database 120. At operation 906, to calculate a lift associated with the media item, the visitation tracking module 606 accesses the database 120 to retrieve the visitation record associated with the media item, and calculates a new visitation over a predefined period of time. The visitation tracking module retrieve the baseline visitation of the geo-fenced area over the predefined period of time, and calculates a lift based on the baseline visitation and the new visitation. At operation 908, the scoring module 608 calculates an engagement score of the media item based on the lift.

Figure 10:
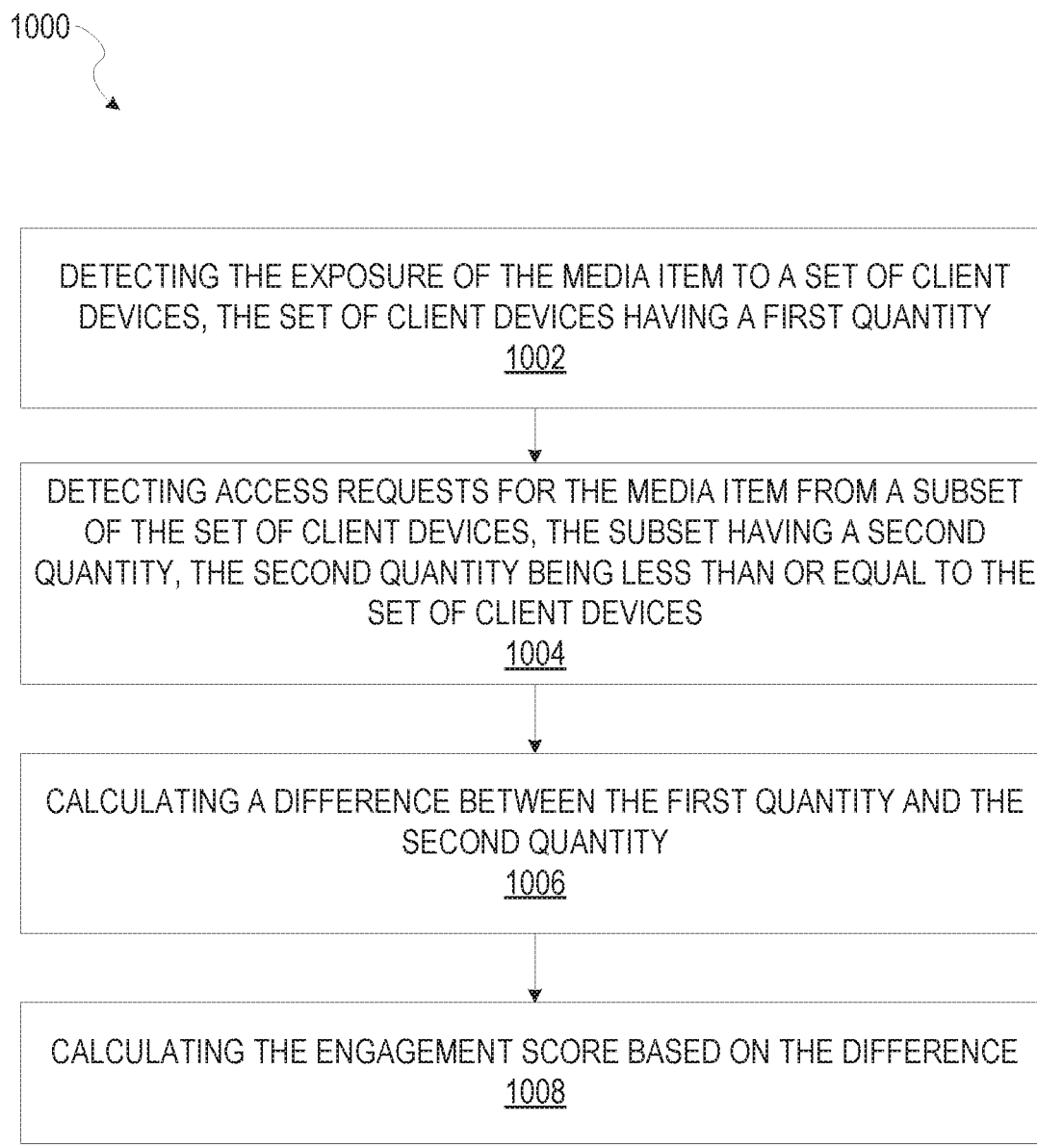
FIG. 10 is a flowchart illustrating a method for calculating an engagement score, according to certain example embodiments.

FIG. 10 is a flowchart illustrating a method 1000 for calculating an engagement score, according to certain example embodiments. As shown in FIG. 10, one or more operations 1002, 1004, 1006, and 1008 may be performed as part (e.g., a precursor task, a subroutine, or a portion) of the method 1000, according to some example embodiments.

In operation 1002, the exposure detection module 604 detects an exposure of a media item to a set of client devices. The set of client devices may receive the media item in an ephemeral message, and cause display of the media item upon accessing the ephemeral message. Upon causing display of the media item, the exposure detection module 604 detects an exposure of the media item to the client device. The exposure detection module 604 records a quantity of the set of client devices within the database 120.

In operation 1004, the geo-fencing module 602 receives an access request for a media item associated with the geo-fence from a subset of the set of client devices. For example, subsequent to being exposed to the media item, the subset of client devices enters into the geo-fenced area associated with the media item and requests access to the media item from the geo-fencing module 602. The subset of client devices may have a quantity that is less than or equal to the set of client devices. The geo-fencing module 602 records the quantity of the subset of client devices.

At operation 1006, the scoring module 608 calculates a difference between the quantity of client devices in the set of client devices and the subset of client devices. At operation 1008, the scoring module 608 calculates an engagement score of the media item based on the difference.

Software Architecture

Figure 11:
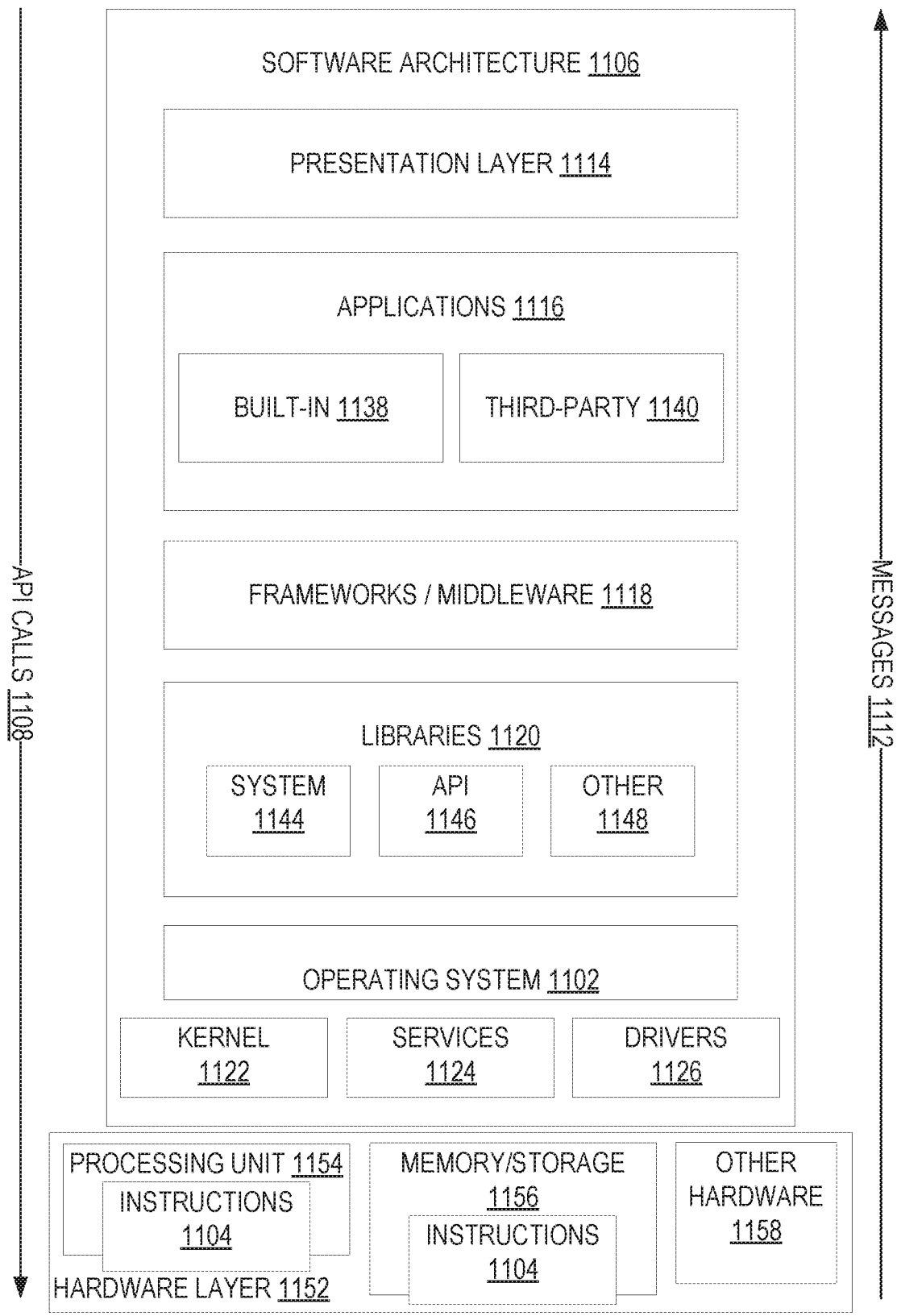
FIG. 11 is a block diagram illustrating a representative software architecture, which may be used in conjunction with various hardware architectures herein described and used to implement various embodiments.

FIG. 11 is a block diagram illustrating an example software architecture 1106, which may be used in conjunction with various hardware architectures herein described. FIG. 11 is a non-limiting example of a software architecture and it will be appreciated that many other architectures may be implemented to facilitate the functionality described herein. The software architecture 1106 may execute on hardware such as machine 700 of FIG. 12 that includes, among other things, processors 1204, memory 1214, and I/O components 1218. A representative hardware layer 1152 is illustrated and can represent, for example, the machine 1200 of FIG. 12. The representative hardware layer 1152 includes a processing unit 1154 having associated executable instructions 1104. Executable instructions 1104 represent the executable instructions of the software architecture 1106, including implementation of the methods, components and so forth described herein. The hardware layer 1152 also includes memory and/or storage modules memory/storage 1156, which also have executable instructions 1104. The hardware layer 1152 may also comprise other hardware 1158.

In the example architecture of FIG. 11, the software architecture 1106 may be conceptualized as a stack of layers where each layer provides particular functionality. For example, the software architecture 1106 may include layers such as an operating system 1102, libraries 1120, applications 1116 and a presentation layer 1114. Operationally, the applications 1116 and/or other components within the layers may invoke application programming interface (API) API calls 1108 through the software stack and receive a response as in response to the API calls 1108. The layers illustrated are representative in nature and not all software architectures have all layers. For example, some mobile or special purpose operating systems may not provide a frameworks/middleware 1118, while others may provide such a layer. Other software architectures may include additional or different layers.

The operating system 1102 may manage hardware resources and provide common services. The operating system 1102 may include, for example, a kernel 1122, services 1124 and drivers 1126. The kernel 1122 may act as an abstraction layer between the hardware and the other software layers. For example, the kernel 1122 may be responsible for memory management, processor management (e.g., scheduling), component management, networking, security settings, and so on. The services 1124 may provide other common services for the other software layers. The drivers 1126 are responsible for controlling or interfacing with the underlying hardware. For instance, the drivers 1126 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1120 provide a common infrastructure that is used by the applications 1116 and/or other components and/or layers. The libraries 1120 provide functionality that allows other software components to perform tasks in an easier fashion than to interface directly with the underlying operating system 1102 functionality (e.g., kernel 1122, services 1124 and/or drivers 1126). The libraries 1120 may include system libraries 1144 (e.g., C standard library) that may provide functions such as memory allocation functions, string manipulation functions, mathematical functions, and the like. In addition, the libraries 1120 may include API libraries 1146 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1120 may also include a wide variety of other libraries 1148 to provide many other APIs to the applications 1116 and other software components/modules.

The frameworks/middleware 1118 (also sometimes referred to as middleware) provide a higher-level common infrastructure that may be used by the applications 1116 and/or other software components/modules. For example, the frameworks/middleware 1118 may provide various graphic user interface (GUI) functions, high-level resource management, high-level location services, and so forth. The frameworks/middleware 1118 may provide a broad spectrum of other APIs that may be utilized by the applications 1116 and/or other software components/modules, some of which may be specific to a particular operating system 1102 or platform.

The applications 1116 include built-in applications 1138 and/or third-party applications 1140. Examples of representative built-in applications 1138 may include, but are not limited to, a contacts application, a browser application, a book reader application, a location application, a media application, a messaging application, and/or a game application. Third-party applications 1140 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1140 may invoke the API calls 1108 provided by the mobile operating system (such as operating system 1102) to facilitate functionality described herein.

Figure 12:
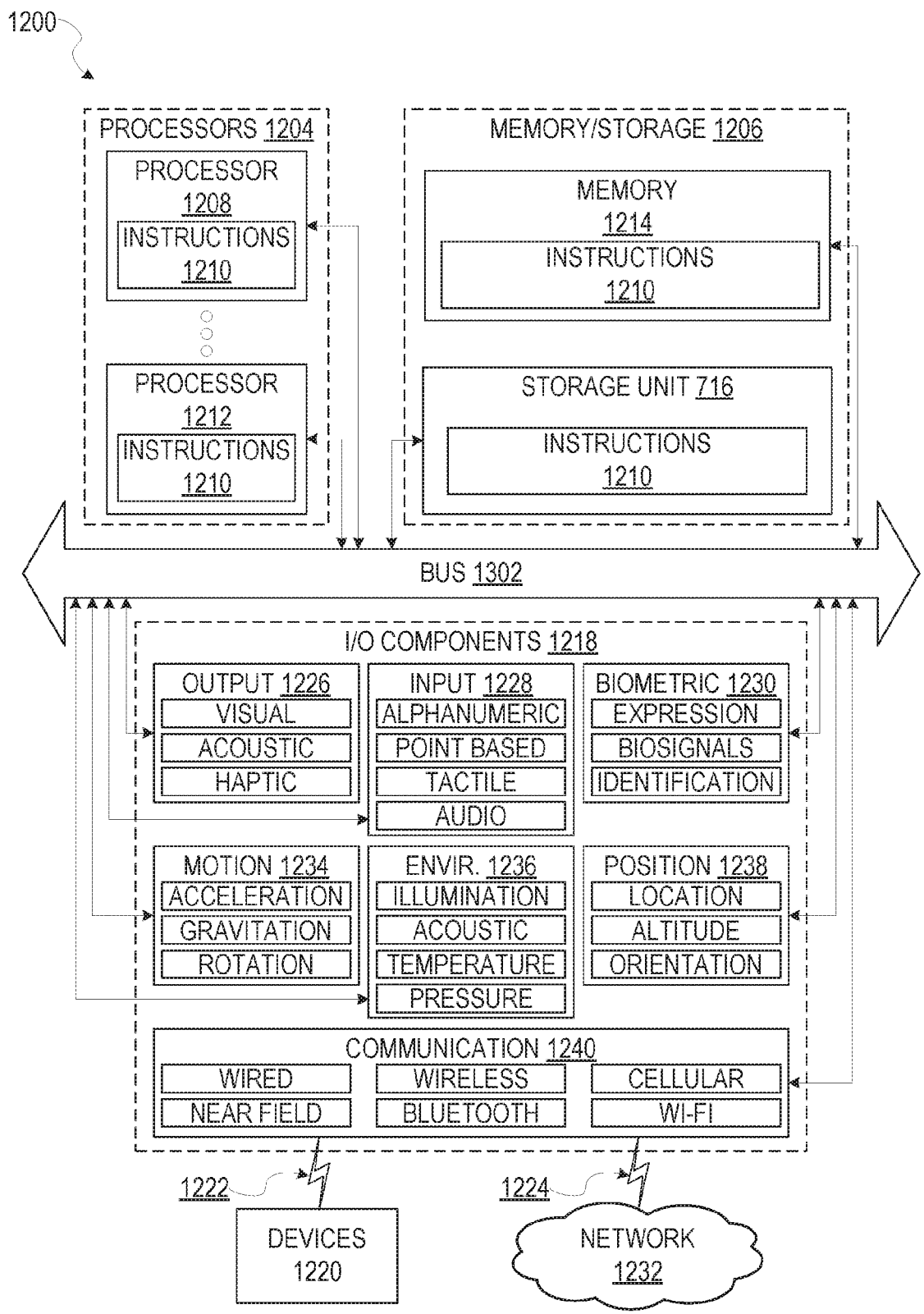
FIG. 12 is a block diagram illustrating components of a machine, according to some example embodiments, able to read instructions from a machine-readable medium (e.g., a machine-readable storage medium) and perform any one or more of the methodologies discussed herein.

The applications 1116 may use built in operating system functions (e.g., kernel 1122, services 1124 and/or drivers 1126), libraries 1120, and frameworks/middleware 1118 to create user interfaces to interact with users of the system. Alternatively, or additionally, in some systems interactions with a user may occur through a presentation layer, such as presentation layer 1114. In these systems, the application/component "logic" can be separated from the aspects of the application/component that interact with a user. FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1210 (e.g., software, a program, an application, an applet, an app, or other executable code) for causing the machine 1200 to perform any one or more of the methodologies discussed herein may be executed. As such, the instructions 1210 may be used to implement modules or components described herein. The instructions 1210 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1210, sequentially or otherwise, that specify actions to be taken by machine 1200. Further, while only a single machine 1200 is illustrated, the term "machine" shall also be taken to include a collection of machines that individually or jointly execute the instructions 1210 to perform any one or more of the methodologies discussed herein.

The machine 1200 may include processors 1204, memory memory/storage 1206, and I/O components 1218, which may be configured to communicate with each other such as via a bus 1202. The memory/storage 1206 may include a memory 1214, such as a main memory, or other memory storage, and a storage unit 1216, both accessible to the processors 1204 such as via the bus 1202. The storage unit 1216 and memory 1214 store the instructions 1210 embodying any one or more of the methodologies or functions described herein. The instructions 1210 may also reside, completely or partially, within the memory 1214, within the storage unit 1216, within at least one of the processors 1204 (e.g., within the processor's cache memory), or any suitable combination thereof, during execution thereof by the machine 1200. Accordingly, the memory 1214, the storage unit 1216, and the memory of processors 1204 are examples of machine-readable media.

The I/O components 1218 may include a wide variety of components to receive input, provide output, produce output, transmit information, exchange information, capture measurements, and so on. The specific I/O components 1218 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1218 may include many other components that are not shown in FIG. 12. The I/O components 1218 are grouped according to functionality merely for simplifying the following discussion and the grouping is in no way limiting. In various example embodiments, the I/O components 1218 may include output components 1226 and input components 1228. The output components 1226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1228 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1218 may include biometric components 1230, motion components 1234, environmental environment components 1236, or position components 1238 among a wide array of other components. For example, the biometric components 1230 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1234 may include acceleration sensor components (e.g., accelerometer), gravitation sensor components, rotation sensor components (e.g., gyroscope), and so forth. The environment components 1236 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1218 may include communication components 1240 operable to couple the machine 1200 to a network 1232 or devices 1220 via coupling 1222 and coupling 1224 respectively. For example, the communication components 1240 may include a network interface component or other suitable device to interface with the network 1232. In further examples, communication components 1240 may include wired communication components, wireless communication components, cellular communication components, Near Field Communication (NFC) components. Bluetooth® components (e.g., Bluetooth® Low Energy). Wi-Fi® components, and other communication components to provide communication via other modalities. The devices 1220 may be another machine or any of a wide variety of peripheral devices (e.g., a peripheral device coupled via a Universal Serial Bus (USB)).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix. Dataglyph. MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as, location via Internet Protocol (IP) geo-location, location via Wi-Fi® signal triangulation, location via detecting a NFC beacon signal that may indicate a particular location, and so forth.

What is claimed is:

1. A system comprising:
    a memory; and
    at least one hardware processor coupled to the memory and comprising an engagement tracking application that causes the system to perform operations comprising:
    maintaining a geo-fence that encompasses a physical location of a proprietor, the geo-fence having a boundary and configured to provide access to a media item to client devices within the boundary of the geo-fence, the media item having access conditions;
    detecting an exposure of a first user to the media item, the exposure including a display of an ephemeral message that includes the media item at a first client device of the first user;
    tracking the first client device in response to the detecting the exposure of the first user;
    detecting an access of the media item by the first client device, the access based on the first client device satisfying access conditions of the media item; and
    calculating an engagement score of the media item based on the tracking the first client device and the access of the media item by the first client device.

2. The system of claim 1, wherein the operations further comprise:
    providing access to the media item to a second client device in response to the second client device transgressing the boundary of the geo-fence, the access enabling the second client device to distribute the media item to one or more client devices; and
    wherein the detecting the exposure of the first user to the media item includes:
    detecting the message from the second client device to the first client device.

3. The system of claim 1, wherein the operations further comprise:
    calculating a baseline visitation of the physical location of the proprietor based on historical transgressions of the geo-fence, the baseline visitation indicating a baseline rate in which unexposed client devices enter the physical location of the proprietor over a predefined period of time, the unexposed client devices having not been exposed to the media item;
    calculating a new visitation of the physical location of the proprietor based on access requests for the media item from exposed client devices, the exposed client devices having been previously exposed to the media item, and satisfying the access conditions of the media item; and
    wherein the calculating the engagement score includes calculating a lift based on the baseline visitation and the new visitation of the physical location.

4. The system of claim 1, wherein the tracking the first client device comprises:
    tracking the first client device for a predefined period of time; and
    wherein the detecting the access of the media item by the first client device occurs within the predefined period of time.

5. The system of claim 1, wherein the tracking the first client device in response to detecting the exposure occurs at a first moment, the detecting the access of the media item by the first client device occurs at a second moment, and the calculating the engagement score includes:

calculating a length of time between the first moment and the second moment; and wherein the calculating the engagement score of the media item is based on the length of time.

6. The system of claim 1, wherein the access is a first access, and the detecting the exposure of the first user to the media item includes:

detecting the exposure of the media item at a set of client devices, the set of client devices having a first quantity; and wherein the operations further comprise:

detecting a second access of the media item from a subset of the set of client devices, the subset satisfying the access conditions of the media item, and the subset having a second quantity; and wherein the calculating the engagement score is based on a difference between the first quantity and the second quantity.

7. The system of claim 1, wherein the access conditions include geo-location criteria, and the satisfying the access conditions of the media item includes:

detecting a transgression of the boundary of the geo-fence by the first client device.

8. A method comprising:

maintaining a geo-fence that encompasses a physical location of a proprietor, the geo-fence having a boundary and configured to provide access to a media item to client devices within the boundary of the geo-fence, the media item having access conditions;

detecting an exposure of a first user to the media item, the exposure including a display of an ephemeral message that includes the media item at a first client device of the first user;

tracking the first client device in response to the detecting the exposure of the first user;

detecting an access of the media item by the first client device, the access based on the first client device satisfying access conditions of the media item; and calculating an engagement score of the media item based on the tracking the first client device and the access of the media item by the first client device.

9. The method of claim 8, wherein the method further comprises:

providing access to the media item to a second client device in response to the second client device transgressing the boundary of the geo-fence, the access enabling the second client device to distribute the media item to one or more client devices; and wherein the detecting the exposure of the first user to the media item includes:

detecting the message from the second client device to the first client device.

10. The method of claim 8, wherein the method further comprises:

calculating a baseline visitation of the physical location of the proprietor based on historical transgressions of the geo-fence, the baseline visitation indicating a baseline rate in which unexposed client devices enter the physical location of the proprietor over a predefined period of time, the unexposed client devices having not been exposed to the media item;

calculating a new visitation of the physical location of the proprietor based on access requests for the media item from exposed client devices, the exposed client devices having been previously exposed to the media item, and satisfying the access conditions of the media item; and wherein the calculating the engagement score includes calculating a lift based on the baseline visitation and the new visitation of the physical location.

11. The method of claim 8, wherein the tracking the first client device includes:

tracking the first client device for a predefined period of time; and wherein the detecting the access of the media item by the first client device occurs within the predefined period of time.

12. The method of claim 8, wherein the tracking the first client device in response to detecting the exposure occurs at a first moment, the detecting the access of the media item by the first client device occurs at a second moment, and the calculating the engagement score includes:

calculating a length of time between the first moment and the second moment; and wherein the calculating the engagement score of the media item is based on the length of time.

13. The method of claim 8, wherein the access is a first access, and the detecting the exposure of the first user to the media item includes:

detecting the exposure of the media item at a set of client devices, the set of client devices having a first quantity; and wherein the operations further comprise:

detecting a second access of the media item from a subset of the set of client devices, the subset satisfying the access conditions of the media item, and the subset having a second quantity; and wherein the calculating the engagement score is based on a difference between the first quantity and the second quantity.

14. The method of claim 8, wherein the access conditions include geo-location criteria, and the satisfying the access conditions of the media item includes:

detecting a transgression of the boundary of the geo-fence by the first client device.

15. A non-transitory machine-readable storage medium comprising instructions that, when executed by one or more processors of a machine, cause the machine to perform operations comprising:

maintaining a geo-fence that encompasses a physical location of a proprietor, the geo-fence having a boundary and configured to provide access to a media item to client devices within the boundary of the geo-fence, the media item having access conditions;

detecting an exposure of a first user to the media item, the exposure including a display of an ephemeral message that includes the media item at a first client device of the first user;

tracking the first client device in response to the detecting the exposure of the first user;

detecting an access of the media item by the first client device, the access based on the first client device satisfying access conditions of the media item; and calculating an engagement score of the media item based on the tracking the first client device and the access of the media item by the first client device.

16. The non-transitory machine-readable storage medium of claim 15, wherein the instructions cause the machine to perform operations further comprising:

providing access to the media item to a second client device in response to the second client device transgressing the boundary of the geo-fence, the access enabling the second client device to distribute the media item to one or more client devices; and wherein the detecting the exposure of the first user to the media item includes:

detecting the message from the second client device to the first client device.

17. The non-transitory machine-readable storage medium of claim 15, wherein the instructions cause the machine to perform operations further comprising:

calculating a baseline visitation of the physical location of the proprietor based on historical transgressions of the geo-fence, the baseline visitation indicating a baseline rate in which unexposed client devices enter the physical location of the proprietor over a predefined period of time, the unexposed client devices having not been exposed to the media item;

calculating a new visitation of the physical location of the proprietor based on access requests for the media item from exposed client devices, the exposed client devices having been previously exposed to the media item, and satisfying the access conditions of the media item; and wherein the calculating the engagement score includes calculating a lift based on the baseline visitation and the new visitation of the physical location.

18. The non-transitory machine-readable storage medium of claim 15, wherein the instructions to track the first client device cause the machine to perform operations that include:

tracking the first client device for a predefined period of time; and wherein the detecting the access of the media item by the first client device occurs within the predefined period of time.

* * * * *

UNITED STATES PATENT AND TRADEMARK OFFICE
CERTIFICATE OF CORRECTION

PATENT NO. : 9,681,265 B1
APPLICATION NO. : 15/195684
DATED : June 13, 2017
INVENTOR(S) : Davis et al.

Page 1 of 1

It is certified that error appears in the above-identified patent and that said Letters Patent is hereby corrected as shown below:

In the Claims

In Column 23, Line 33, in Claim 8, delete "user:" and insert --user;-- therefor

Signed and Sealed this
Fourth Day of June, 2019

Andrei Iancu
*Director of the United States Patent and Trademark Office*